Dec. 23, 1947.  F. A. NICHOLS  2,433,291
WEIGHING MECHANISM
Filed Oct. 15, 1946  2 Sheets-Sheet 1

INVENTOR.
FREDERICK A. NICHOLS
BY
John F. Hanrahan
ATTORNEY

Dec. 23, 1947.  F. A. NICHOLS  2,433,291
WEIGHING MECHANISM
Filed Oct. 15, 1946  2 Sheets-Sheet 2
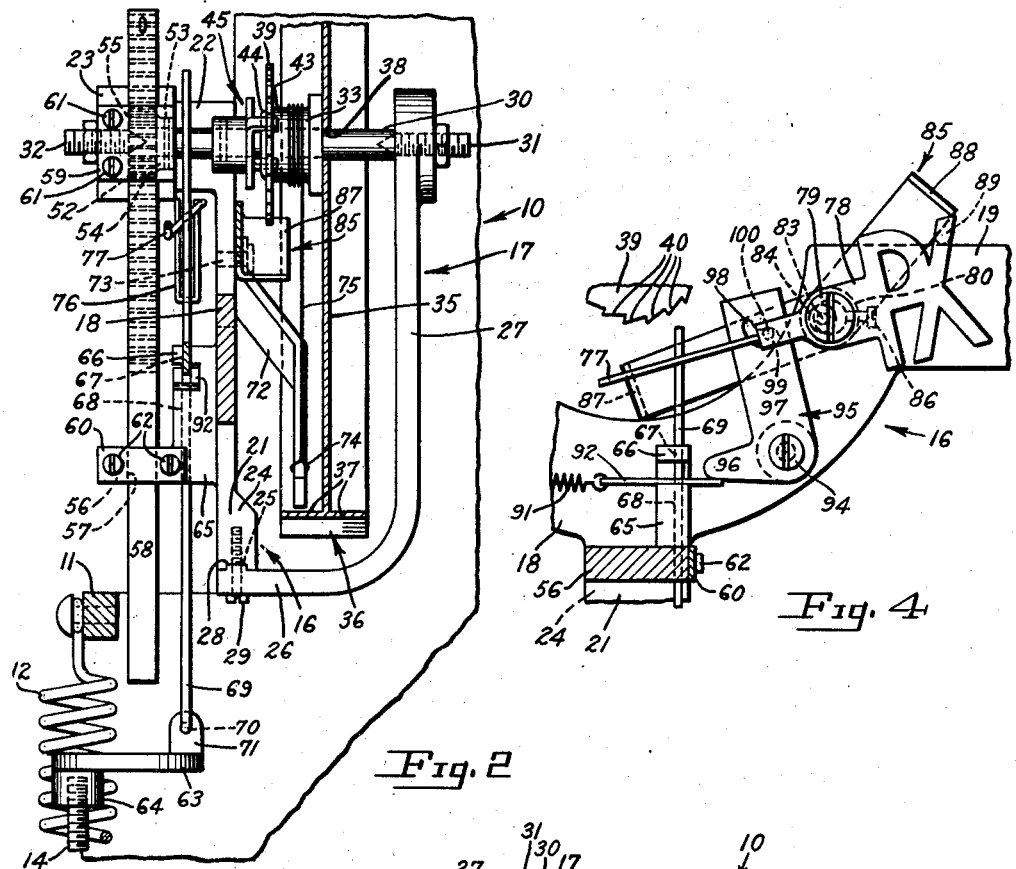
Fig. 2
Fig. 4
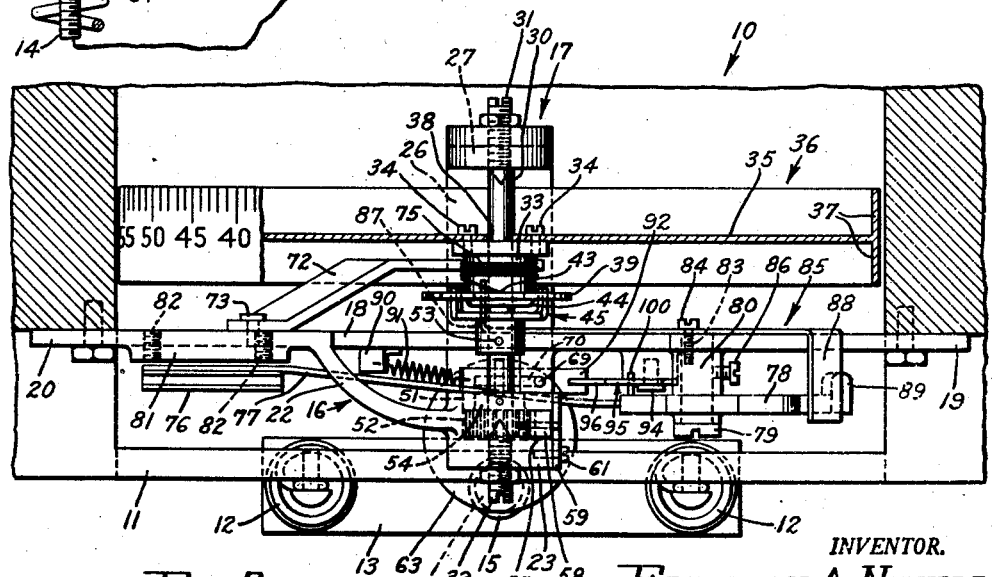
Fig. 3
INVENTOR.
FREDERICK A. NICHOLS
BY
John H Hanrahan
ATTORNEY Patented Dec. 23, 1947

2,433,291

UNITED STATES PATENT OFFICE 2,433,291

WEIGHING MECHANISM

Frederick A. Nichols, Stratford, Conn., assignor to Rx Scale Manufacturing Company, Inc., New Haven, Conn., a corporation of Connecticut Application October 15, 1946, Serial No. 703,439

4 Claims. (Cl. 194—47)

This invention relates to new and useful improvements in weighing mechanisms and has particular relation to a coin controlled scale.

An object of the invention is to provide in a weighing mechanism including a graduated or marked drum, a simple and inexpensive means for the making of slight adjustments in the position of the drum on its shaft to bring it to absolute zero position.

Another object is to provide in a coin controlled scale a simple yet reliable means whereby but one weighing may be obtained for one coin.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 2 is a vertical sectional view taken substantially along the plane of the line 2—2 of Fig. 1;

Fig. 3 is a view partly in top plan and partly in section of the weighing mechanism;

Fig. 4 is a detail elevational view showing the positions of the coin release parts after a coin has been deposited and a person is being weighed;

Figure 1:
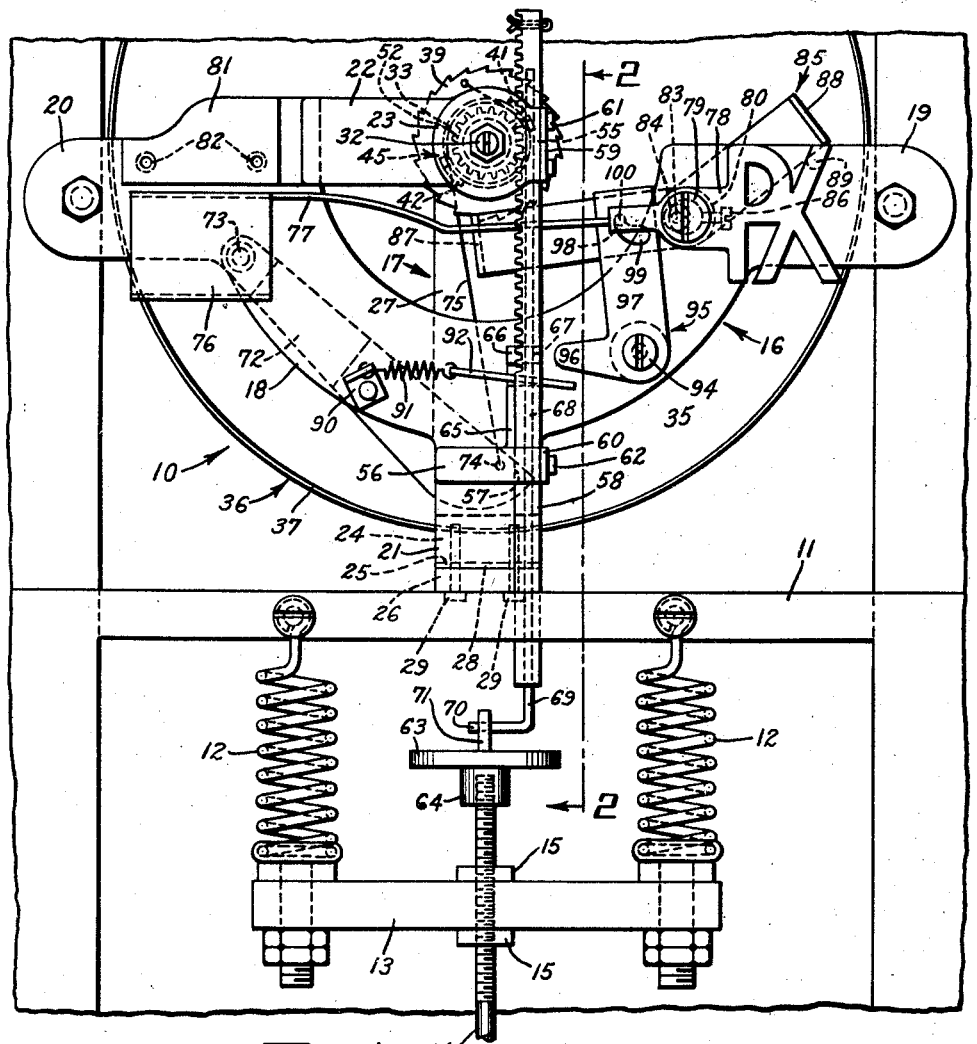
Fig. 1 is a view showing the operating mechanism of the present device in elevation with the parts positioned as when a weight is on the scale platform but prior to the depositing of a coin, a portion of the scale housing being shown in section.
Figure 5:
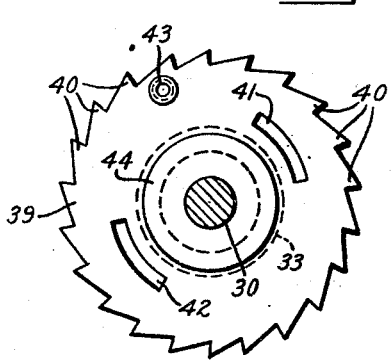
Fig. 5 is a front view of a ratchet wheel employed.
Figure 6:
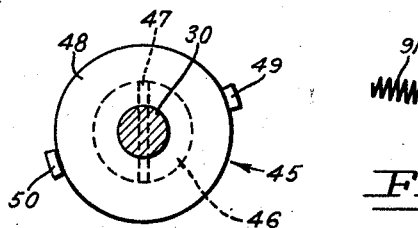
Fig. 6 is a rear view of a dog or pawl employed.
Figure 7:
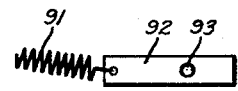
Fig. 7 is a plan view of a latch means employed.

Referring in detail to the drawing, at 10 is indicated a portion of a scale casing of any desired design as, for example, that shown in my Design Patent 105,132 of June 29, 1937. Supported and located within such casing is a horizontal stationary bar 11 from which are suspended a pair of relatively heavy coil springs 12 secured at their lower ends to a movable cross bar 13. Connected centrally with the cross bar 13 is a steelyard 14 extending downwardly and connected with a suitable platform mechanism (not shown) as is usual in the art.

The steelyard 14 extends through the cross bar 13 and is fixed thereto as by nuts 15 threaded on the steelyard and engaging the upper and lower surfaces of the cross bar. This is a usual or conventional structure and any pull on the steelyard 14 results in elongation of the springs 12.

The actual scale mechanism with which the present application is concerned is mounted on a supporting or frame structure including a casting generally designated 16 and a second casting generally designated 17. Casting 16 includes an intermediate portion 18 extending generally across the scale housing 10 and at its ends including a pair of ear-like portions 19 and 20 bolted or otherwise secured to the scale housing. Additionally, there is a depending portion 21 of the casting and then extending upwardly and forwardly from the main body of the casting, just inwardly of the ear 20, is an arm 22 carrying a head-like portion 23.

The lower end of portion 21 is thickened as at 24 (see Fig. 2) and has a groove 25 formed in its under edge. Casting 17 is somewhat L-shaped and includes a generally horizontal arm 26 and a generally vertical arm 27. This horizontal arm 26 has a tongue 28 entering the groove 25 and then one or more screws 29 pass through the outer or free end portion of the arm 26 and the tongue 28 and into the thickened portion 24 of the casting 16. In this way the two castings are rigidly connected and it will be apparent that if desired the mounting structure provided by these castings may be an integral piece.

The operating parts of the weighing mechanism are mounted on the frame provided by the castings 16 and 17. To this end a shaft 30 is supported at its inner or rear end on a cone screw 31 passing through the upper end portion of casting arm 27. The forward end of the shaft extends into the head-like portion 23 of the casting 16 and is therein supported by a second cone screw 32 threaded through the front wall of said head-like portion. Thus, it will be seen that shaft 30 is mounted securely yet is freely rotatable.

Mounted on the shaft 30 but free to turn thereon is a bobbin 33 against the rear side of which a series of screws 34 fasten the web portion 35 of a relatively large diameter drum 36. This drum includes an outer flange 37 which will be marked to indicate pounds, or which may be more finely sub-divided if desired, and the markings on the outer surface of this flange 37 are to be read in connection with an indicator, as a pointer, as is general in the art.

Web 35 of the drum 36 has an opening 38 therethrough for the accommodation of the shaft 30 so that the drum does not directly engage the shaft but is supported about the same by the bobbin 33. On the forward end of the bobbin 33 is secured a ratchet wheel 39. This ratchet wheel, in addition to its peripheral teeth 40, is provided with a pair of arcuate openings 41 and 42 arranged opposite one another and each struck on a radius having the center of the wheel for its center.

A hollow rivet 43 passes through the ratchet wheel 39 for a purpose to be described. The manner in which the ratchet wheel is fastened to the bobbin 33 is not of great importance and here it is shown as clamped in place by the spunover portion 44 of a reduced extension of the bobbin.

On the shaft 30 forwardly of the ratchet wheel 39 is a device or dog 45 including a hub portion 46 fastened to the shaft as by means of a pin 47 and also including a flange or disc portion 48 carrying a pair of rearwardly extending lugs 49 and 50 located in the arcuate slots 41 and 42 of the ratchet. Obviously the slots are of considerably greater length than the width of the lugs 49 and 50.

The head 23 on the arm 22 of the casting 16 is hollowed out from its rear side so that it contains a cavity or socket 51. This socket receives a gear or pinion 52 fixed on the forward end portion of the shaft 30 as by a pin 53 passing through the shaft and a collar-like portion 54 integral with the gear. From the above description, it will be seen that the shaft 30 is mounted for rotation by the screws 31 and 32, that the bobbin 33 is not connected directly with the shaft and carries the drum 36 and the ratchet 39, that the dog 45 is fastened to the shaft and controls movement of the bobbin and associated parts relative to the shaft, and that the gear 52 located in the socket or recess 51 is fast to the shaft.

A slot 55 is milled or otherwise formed through the head 23 from one lateral side thereof and this slot enters the recess or cavity 51 in the head. Aligned with the head 23 and located below the same is a lug 56 which also has a slot 57 milled therethrough. These two slots receive and guide a rack bar 58, the teeth of which mesh with those of the gear 52.

When the rack is in place with its teeth meshed with said gear, plates 59 and 60 are secured over the slotted sides of head 23 and the lug 56 as by screws 61 and 62, respectively. Since the rack is meshing with the gear 52, it will be understood that the rack moves when the gear turns and is held against motion when the gear is stationary.

A stop device which limits downward movement of the rack and returns the rack to its normal position is shown at 63 and the same comprises a disc or plate-like body on its underside provided with a tapped protuberance 64 into which the upper end of the steelyard 14 is threaded. Casting 16 and particularly the part 21 thereof carries the lug 56 at the outer side of an enlargement 65 and above such enlargement 65 carries a lug 66.

Aligned openings 67 and 68 are provided in the lug 66 and the enlargement 65 and slidable in such openings is a wire or rod 69 the lower end of which is bent to provide a toe portion 70 passing through an opening in a lug 71 integral with the upper side of the stop 63. Clearly, the position of the rod 69 is controlled by the position of the stop 63.

A lever 72 is pivoted at one end as at 73 to the casting 18 and connected with the free end of said lever as at 74 is a strong, flexible member 75 which extending upwardly is wound on the bobbin 33 and has its upper end passed through the hollow rivet 43 and anchored to the same as by a large knot at the other side of such rivet. The weighted lever 72 operating through the flexible member 75 is constantly attempting to rotate the bobbin 33 so as to keep the ends of the arcuate slots 41 and 42 of the ratchet against edges of the lugs 49 and 50 of the dog or pawl 45 and to thus impart a tendency to the turning of the shaft 30. Other means for the same purpose may be provided.

In this way, a slight but constant pressure is kept on the gear 52 and its relation with the teeth of the rack 58 so that any backlash between the gear and rack is always in the same direction. As will later be described, during the weighing operation, the bobbin 33 and associated parts rotate and at this time the arm 72 moves from the position of Fig. 1 and then as the weight is relieved and the parts moved back to normal positions the bobbin is caused to rotate and rewind a portion of the element 75 on the bobbin.

A U-shaped coin receiving device 76 is carried on the end of a wire or bar 77 at its inner end anchored to a lever 78. Lever 78 is pivotally mounted on the casting 16 as by a stud 79 passing through the lever 78 and a lug or projection 80 on the forward face of the casting. The weight of the lever 78 relative to the pivot 79 is such as to tend to keep the coin receiver in the position of Fig. 1. However, as the description proceeds, it will become clear that this coin receiver only temporarily receives the coin and that the received coin serves to overbalance the mechanism including the lever 78 and then the coin falls out of the receiver 76. Pad 81 formed on the arm 22 of casting 16 is provided with tapped openings 82 for the reception of screws (not shown) to be used in the mounting of a coin chute (not shown). At its inner end the stud 79 has an eccentric opening 83 receiving the stem of a screw 84 passing through an intermediate portion of a pawl, generally designated 85. The screw 84 pivotally mounts the pawl 85 at the inner end of the stud 79. A set screw 86 passes through the lug or protuberance 80 and is adapted when tightened to lock the stud 79 in position.

Pawl 85 includes a bent portion or tooth 87 located to engage with the teeth 40 of the ratchet 39 and further includes a bent end portion 88 located in the path of a lug 89 on the rear side of a portion of the lever 78. A clip 90, fastened to the casting part 18, anchors one end of a coil spring 91, the other end of which is connected with a trip or latch device 92. Device 92 is in the form of a short strip of metal having an opening 93 therethrough of a diameter to permit the rod 69 to move therethrough. This device 92 extends between the lugs 65 and 66 of the casting as in Fig. 2 and has the rod 69 passing through its opening 93.

A pivot 94 mounts a bell crank lever 95 on the casting 16. Bell crank 95 includes a short arm or toe portion 96 with a longer arm 97 in its upper portion provided with a slot including a relatively narrow vertical portion 98 and a wider or enlarged horizontal portion 99. A pin 100 on the lever 78 is located in this slot and is adapted to occupy different portions therein as will now be set forth in the description of the operation of the mechanism.

When the parts are as in Fig. 1, a person wishing to be weighed is standing on the scale platform (not shown) but has not deposited a penny or other coin which is delivered to the receptacle 76. In this figure the springs 12 are somewhat elongated, the stop 63 is down as is the rod 69, but the rack 58 is not against the stop being held by the gear 52. In turn the gear is held by the shaft 30 which is locked by the pawl 85 acting through the ratchet wheel 39 and the dog 45. Immediately the weight was placed on the platform, the steelyard 14 was drawn down and drew down the cross bar 13, extending the springs 12, and drawing down the rod 69. However, at that time, no other part of the mechanism moves.

When the coin is deposited, as it is received in receptacle 76, it helps overbalance the lever 78 so that the latter rocks on its pivot 79 and causes counterclockwise movement of the pawl 85. Thus, the lug or tooth 87 of the pawl is freed from the teeth of the ratchet 39. Now, as the ratchet is free to move, the shaft 30 and all parts thereon are free to rotate and rotary movement is imparted to these parts by the weighted lever 72 and the weight of the rack bar 58. As the shaft 30 and the gear 52 rotate the rack bar moves downwardly until it is lower and rests on the upper side of the stop disc 63. When this occurs, further rotation of the gear 52 and thus of the shaft 30 is prevented.

However, because the only connection between the drum 36 and the shaft is through the lugs 49 and 50 and the slots 41 and 42 of the ratchet, the drum may bounce back and forth in a short arc until it comes to rest. The jarring caused by this movement will insure all parts of the mechanism operating in the event they are inclined to stick in position.

Because of the slight pull exerted by the element 75 and the weighted lever 72, the drum will come to a position of rest at the extreme point to which it would be permitted to rotate due to the presence of the lugs 49 and 50, in the slots 41 and 42. The manner in which the periphery of the drum is exposed so as to be read to give the weight is not of importance in the present instance and may be any conventional structure desired.

When the lever 78 and associated parts are tilted, the pin 100 is carried into the wide slot portion 99 of bell crank 95, which slot portion is substantially horizontal. This is made possible, both due to the tilting of the lever 78 and the rocking of the bell crank 95 on its pivot in a counterclockwise direction. Now, as the coin drops from receptacle 76, the lug 89 on the lever 78 is in the path of return movement of the tooth 88 of the pawl 85. Further, lever 78 is held against return movement by the position of the pin 100 in the L.-shaped slot of the bell crank.

The described rocking movement brings the toe portion 96 of the bell crank onto the free end portion of the lock plate or safety device 92. Now, when the user steps off the scale platform, springs 12 act to raise the bar 13 and this shifts the plate 63 upwardly moving the rack 58 upwardly. As the rack moves upwardly it rotates the shaft 30 through the gear 52 winding the element 75 onto the bobbin 33 and raising the weighted lever 72.

At this time, the drum 36 is being returned to zero position. It will be understood that the coin has fallen from the receptacle 76 and that the lever 78 and associated parts including the pawl 85 are attempting to return to their normal positions. However, with the pin 100 in the horizontal portion 99 of the slot, this action is prevented until there is a slight upward movement of the stop disc 63.

As this disc moves upwardly, the rod 69 is moved upwardly and the plate 92 being slightly biased with respect to such rod by the spring 91, the rod has a tendency to bind in the opening 93 in the plate and raise the latter. On downward movement of rod 69, the plate 93 may flatten against the lug 65 to have the opening 93 normal to the rod. However, on upward movement of the rod there is nothing to maintain such normal relation and the plate is tilted as suggested by the dotted lines in Fig. 4.

As the plate moves upwardly it engages the toe portion 96 of the bell crank 95 and rocks the latter on the pivot 94 so that the pin 100 may move into the narrower but vertical portion 98 of the slot as the lever 78 and associated parts rock or gravitate in a clockwise direction. As such rocking movement of lever 78 occurs, the lug 89 moves downwardly permitting the lever 85 to rock in a clockwise direction and the tooth engaging portion 87 of the pawl comes against the ratchet 39. However, the ratchet teeth may move in a counterclockwise direction over the tooth 87 until the drum has returned to zero position and then a tooth of the ratchet has a straight side against the pawl tooth 87 and the drum is held against clockwise movement.

The action of the lock plate 92 is of importance as insuring that but one weight will be given for one coin. Assuming that a party has been weighed, and a second party attempts to get weighed for the same coin. As any jostling or change of weight occurs, as one party moves off the scale platform and the other party moves thereon, any slight upward movement of the disc 63 will impart a similar movement to the rod 69 so that the latch device 92 will be moved upwardly to rock the bell crank from the position of Fig. 4 to the position of Fig. 1. This instantly releases lever 78 and pawl 85. They return to their normal positions with the pawl 85 locking the ratchet 39 and thus the drum 36 against any but return movement or movement toward zero reading of the drum.

The eccentric location of the screw 83 in the stud 79 is of importance. When the mechanism is set up it may be discovered that owing to some slight inaccuracy engagement of the tooth 87 of pawl 85 with a tooth of the ratchet 39 does not have the drum set quite in position with its zero mark opposite the pointer. At such time, adjustment is easily made by loosening the set screw 86 and then turning of the stud 79. As the stud is turned the location of the screw 83 is shifted to move the pawl 85 slightly to the right or to the left as may be desired.

The pawl is adjusted until a tooth of the ratchet 39 is against the tooth of the pawl and the zero mark on the drum is opposite the pointer. Since the screw 83 is eccentric with respect to the stud 79, it will be understood that by turning the latter, screw 78 may be shifted to either side of the center of the stud. Thus, for the purpose of the present adjustment, the eccentric structure disclosed provides for a very substantial adjustment. After the proper adjustment is made, set screw 86 is tightened.

Having thus set forth the nature of my invention, what I claim is:

1. In a weighing scale including a rotatable graduated member and a ratchet rotatable with said member, means tending to rotate said member in one direction and a pawl cooperating with said ratchet for securing the member against such rotation and with its zero marking opposite a pointer, adjustable means mounting said pawl for changing the position thereof to permit of slight rotation of the ratchet and member to bring the zero marking of the latter opposite a pointer, and means to thereafter secure the pawl in its adjusted position.

2. In a weighing scale including a rotatable graduated member and a ratchet rotatable with said member, means tending to rotate said member in one direction and a pawl cooperating with said ratchet for securing the member against such rotation and with its zero marking opposite a pointer, a rotatable means, means mounting said pawl on said rotatable means in eccentric relation to the latter whereby on turning of the latter the position of the pawl relative to the ratchet is adjusted so as to permit of the member moving to a position with its zero marking in line with a pointer, and means to lock said rotatable means in adjusted position.

3. In a weighing mechanism including a graduated member, means rotatably mounting said member, a pawl and ratchet mechanism normally maintaining said member in zero position, a coin releasable means for shifting the pawl away from the ratchet to permit of rotation of the member, a stop device movable in one direction in accordance with a weight on the scale, spring means for returning said stop device to normal position on the removal of the weight from the scale, a rod movable in accordance with movements of said stop device, a plate through which said rod is freely movable in one direction, means for latching said pawl in said released position, said plate adapted on movement in one direction to shift said latch means to permit of the pawl moving back into locking engagement with the ratchet, and said plate movable to trip said latch device on initial return movement of said rod under the influence of said spring means.

4. In a weighing mechanism including a graduated member, means rotatably mounting said member, a pawl and ratchet mechanism normally maintaining said member in zero position, a coin releasable means for shifting the pawl away from the ratchet to permit of rotation of the member, a stop device movable in one direction in accordance with a weight on the scale, spring means for returning said stop device to normal position on the removal of the weight from the scale, a rod movable in accordance with movements of said stop device, a plate through which said rod is freely movable in one direction, means for latching said pawl in said released position and comprising a pivoted lever having a generally L-shaped slot therein and a pin on said coin releasable means and located in said slot, said plate adapted on movement in one direction to shift said lever to permit of vertical movement of said coin releasable means and said pawl to bring the latter into locking engagement with the ratchet, and said plate movable to shift said lever on initial return movement of said rod under the influence of said spring means.

FREDERICK A. NICHOLS.